US006527123B1

(12) United States Patent
Ausaf

(10) Patent No.: US 6,527,123 B1
(45) Date of Patent: Mar. 4, 2003

(54) ONE PIECE FOLDABLE BOX ENCLOSING A FOOD RECEPTACLE

(76) Inventor: Nick Ausaf, 10167 Sailwinds Blvd., #102, Largo, FL (US) 33773

( * ) Notice: Subject to any disclaimer, the term of this patent is extended or adjusted under 35 U.S.C. 154(b) by 12 days.

(21) Appl. No.: 09/925,783

(22) Filed: Aug. 9, 2001

(51) Int. Cl.[7] .......................... B65D 77/00; A45C 11/20
(52) U.S. Cl. ...................... 206/549; 206/541; 206/564; 229/904
(58) Field of Search ................ 206/546, 541, 206/562, 563, 564, 565, 216, 217; 229/904; 426/120

(56) References Cited

U.S. PATENT DOCUMENTS

| | | | | |
|---|---|---|---|---|
| 3,899,119 A | * | 8/1975 | Roccaforte | 206/562 |
| 4,173,286 A | * | 11/1979 | Stanko | 206/433 |
| 4,572,423 A | * | 2/1986 | Spencer | 206/562 |
| 4,705,173 A | * | 11/1987 | Forbes, Jr. | 206/563 |
| 4,738,364 A | | 4/1988 | Yeager | |
| 4,838,444 A | | 6/1989 | Bitel | |
| 4,947,991 A | | 8/1990 | Snell | |
| 4,957,237 A | * | 9/1990 | Madonna et al. | 229/120 |
| 5,005,702 A | | 4/1991 | Davis et al. | |
| 5,148,919 A | | 9/1992 | Rubin | |
| 5,390,798 A | * | 2/1995 | Yanuzzi | 206/562 |
| 5,588,587 A | * | 12/1996 | Stier et al. | 229/232 |
| 5,765,689 A | | 6/1998 | Cobden et al. | |
| 5,788,081 A | | 8/1998 | Bates | |
| 5,833,056 A | | 11/1998 | Goldman | |
| 5,967,319 A | | 10/1999 | White, Jr. | |
| 5,979,646 A | | 11/1999 | Strachan | |
| 5,996,802 A | | 12/1999 | Parker et al. | |
| 6,183,027 B1 | * | 2/2001 | Tsao | 294/146 |
| 6,216,855 B1 | | 4/2001 | Gröne | |
| 6,257,403 B1 | * | 7/2001 | Feldmeier | 206/217 |

* cited by examiner

*Primary Examiner*—Mickey Yu
*Assistant Examiner*—Jila M Mohandesi
(74) *Attorney, Agent, or Firm*—Larson & Larson, PA; James E. Larson

(57) ABSTRACT

A planar bottom panel is attached by a first side member to a top cover panel and by a second side member to a planar food tray cover panel. The side members of the planar bottom panel enclose a food or beverage styrofoam insert having depressions for receipt of food or beverage containers. The food tray cover panel folds over a top surface of the styrofoam insert. Sections of the food tray cover panel are removed to insert the food or beverage containers and then the top cover panel is folded over the food tray cover panel to seal the box containing food and beverage items.

15 Claims, 13 Drawing Sheets ial elevation of the styrofoam insert.
ONE PIECE FOLDABLE BOX ENCLOSING A FOOD RECEPTACLE

FIELD OF THE INVENTION

This invention relates to a receptacle for food items. More particularly it refers to a one piece foldable box enclosing a styrofoam food or beverage cup holder.

BACKGROUND OF THE INVENTION

Boxes for retaining food and beverage items are well known as shown in U.S. Pat. Nos. 5,788,081 and 5,967,319. Furthermore, trays for retaining food and beverage items are known from U.S. Pat. Nos. 5,765,689; 5,833,056; 5,979, 646; 5,996,802 and 4,947,991. Most of the prior art food and beverage trays are not covered and are generally not adapted for carrying food or beverage items for any substantial distance from the food or beverage source. These prior art food and beverage trays are not protected from spillage or contamination.

A need has been generated for transporting food and beverage items in a protected container that is simple and inexpensive to produce.

SUMMARY OF THE INVENTION

The present invention solves the above problem by providing a one piece box that can enclose a food or beverage insert and protect the food and beverage items from spillage and contamination.

The one piece box has a planar bottom panel attached by a first side member to a top cover panel and by a second side member to a planar food tray cover panel. Third and fourth side members attached to the bottom panel have inwardly folded end portions. The third and fourth side members are folded upwardly and the end portions folded inwardly to enclose a styrofoam food or beverage insert. The food tray cover panel folds over a top surface of the food or beverage insert. After food and beverage containers are placed in depressions of the food or beverage insert, the top cover panel encloses the food and beverage items to close the box.

BRIEF DESCRIPTION OF THE DRAWINGS

The invention can be best understood by those having ordinary skill in the art by reference to the following detailed description when considered in conjunction with the accompanying dr s in which.

DETAILED DESCRIPTION OF THE INVENTION

Figure 1:
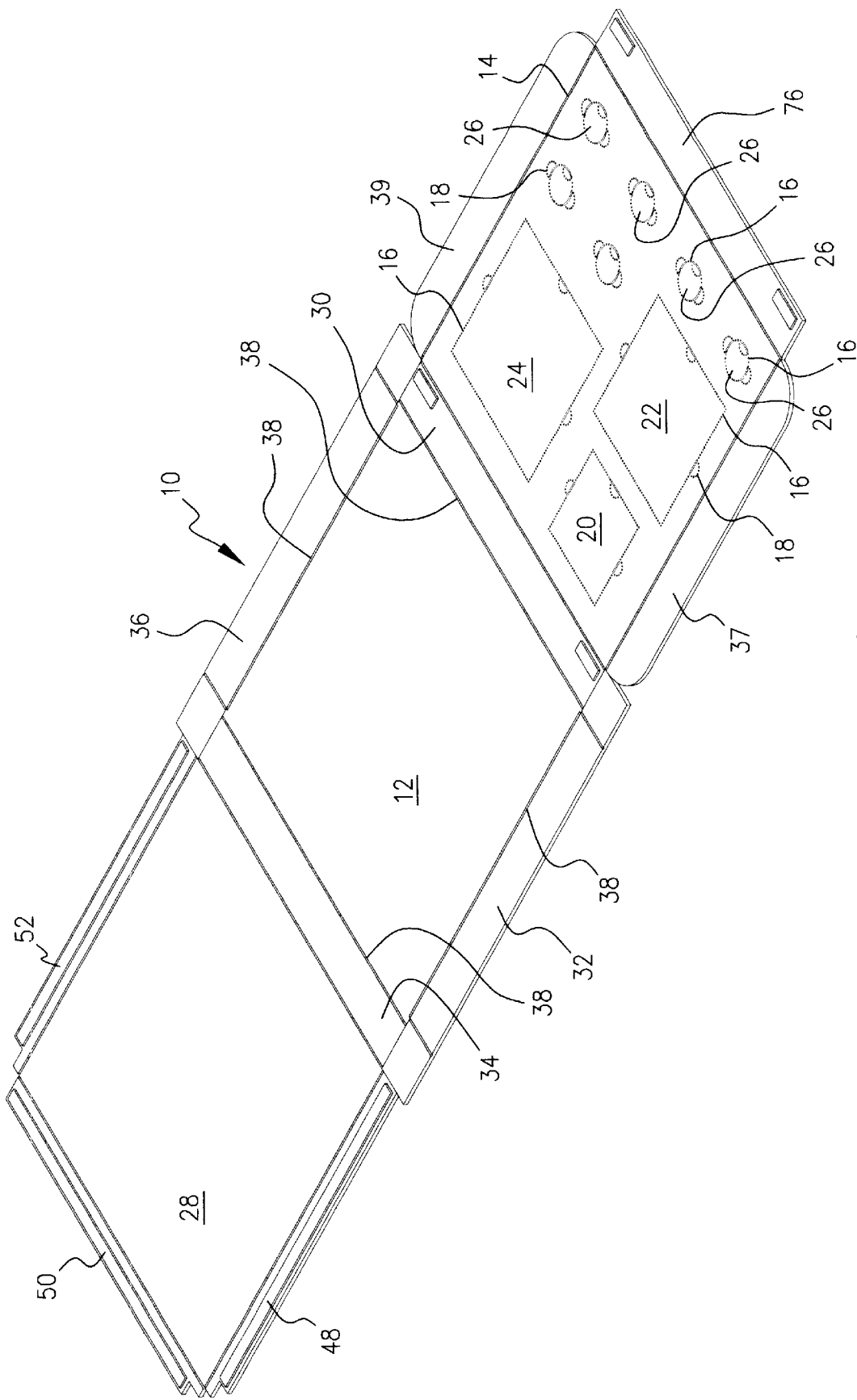
FIG. 1 is a perspective view of the one piece box prior to folding.

Throughout the following detailed description the same reference numerals refer to the same elements in all figures.

Figure 2:
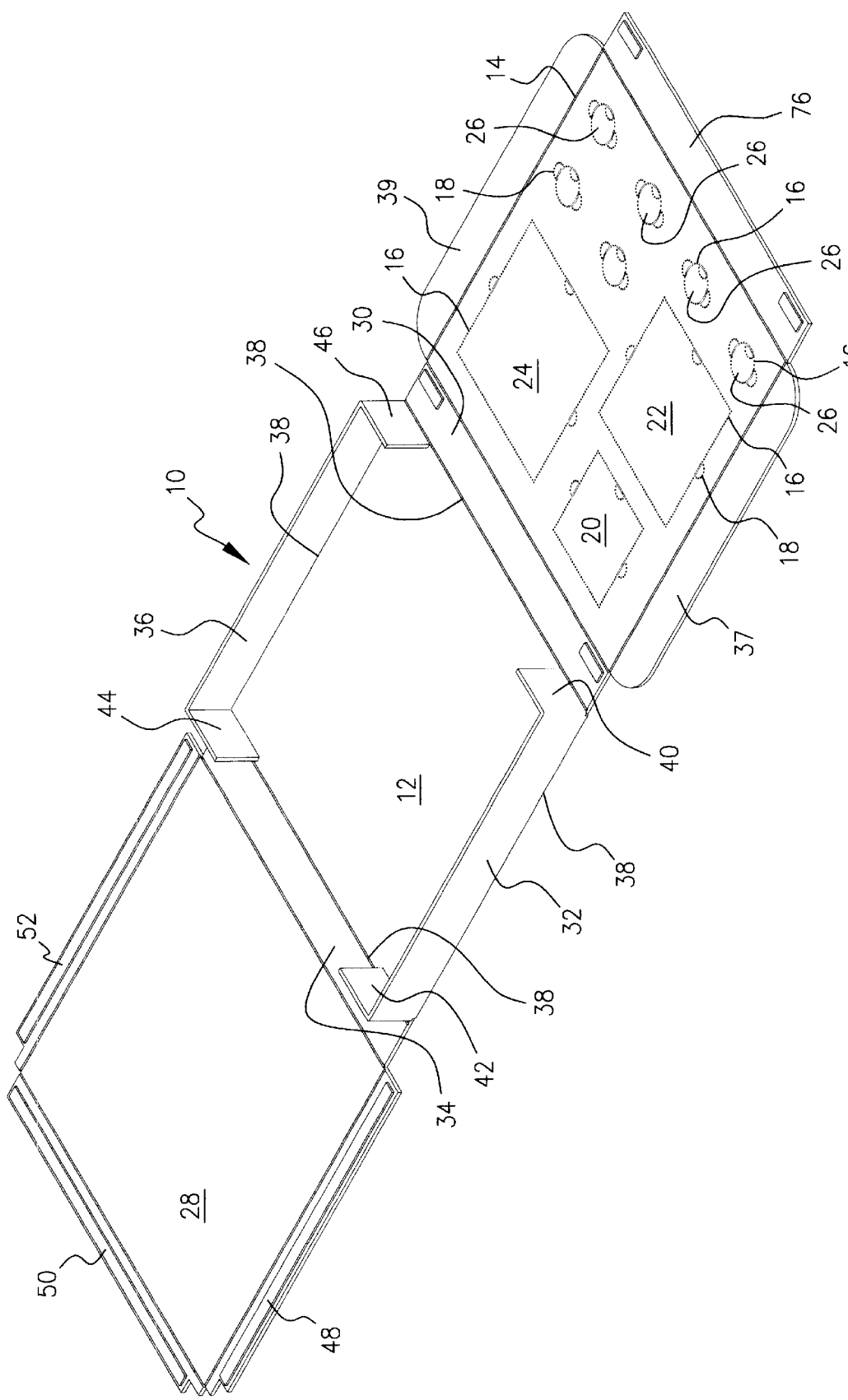
FIG. 2 is a perspective view of the one piece box partially folded together.
Figure 3:
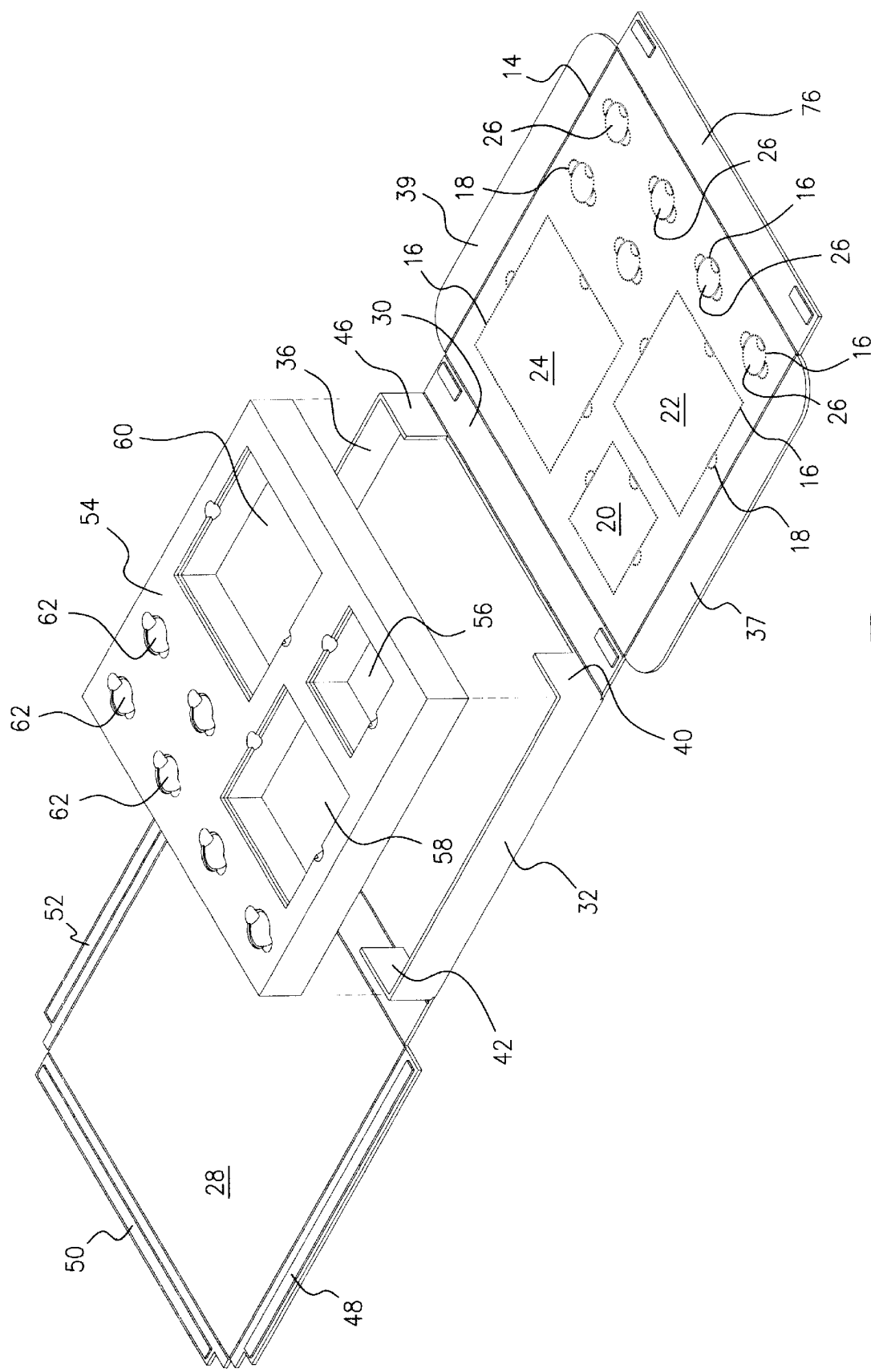
FIG. 3 is an exploded view of the one piece box partially folded for receipt of a styrofoam insert.

Referring to FIG. 2, the one-piece foldable box 10 has a base portion 12, a food tray cover portion 14 and a top cover portion 28. The food tray cover 14 contains perforations 16 and tabs 18 for assistance in removing sections 20, 22, 24 and 26 outlined by perforations 16. The base portion 12 has fold up side portions 30, 32, 34 and 36. Creases 38 allow for rotation of side portions 30, 32, 34 and 36 upwards at a right angle to the base portion 12 as seen in FIG. 3. The end portions 40 and 42 on side portion 32 fold inward and end portions 44 and 46 of side portion 36 likewise fold inward as seen in FIG. 3. Top cover portion 28 has sticky tabs 48, 50 and 52 for easy remove to expose an adherence substance to be discussed later.

The one-piece structure 10 of portions 12, 14 and 28 are made from a cardboard or heavy paper material. Other suitable materials can be substituted for the cardboard box material.

Figure 4:
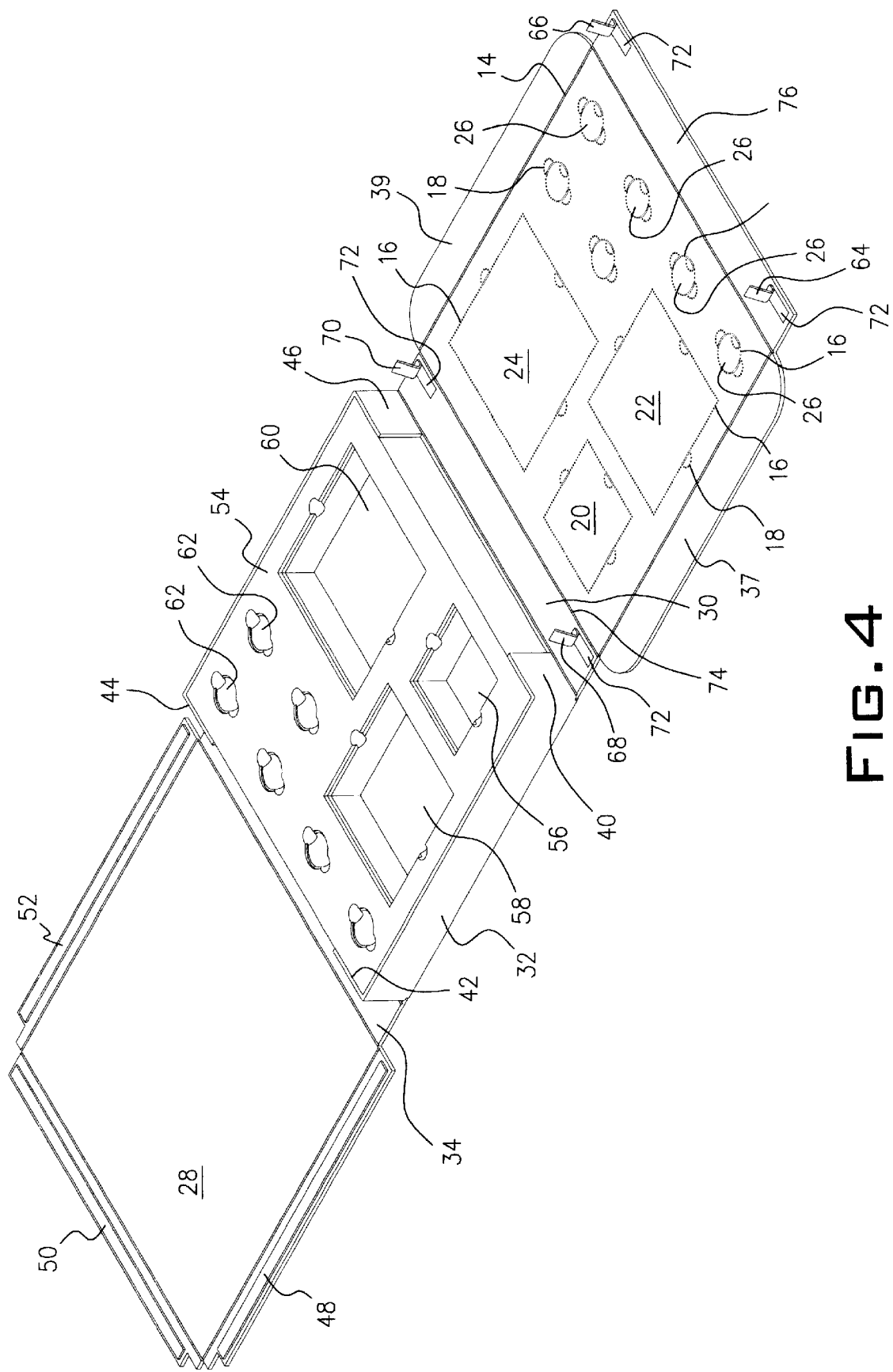
FIG. 4 is a perspective view of the one piece box with a styrofoam insert mounted in a mid-portion.

Referring to FIG. 4, a styrofoam insert 54 is inserted inboard of upright sides 32 and 36. The insert alternatively can be made of any plastic or cardboard, but it is preferred to have it made from a light weight material such a styrofoam. The insert 54 has multiple depressions 56, 58, 60 and 62. Of course a single depression can be used for a large item such as a pizza or a bowl of soup.

Figure 5:
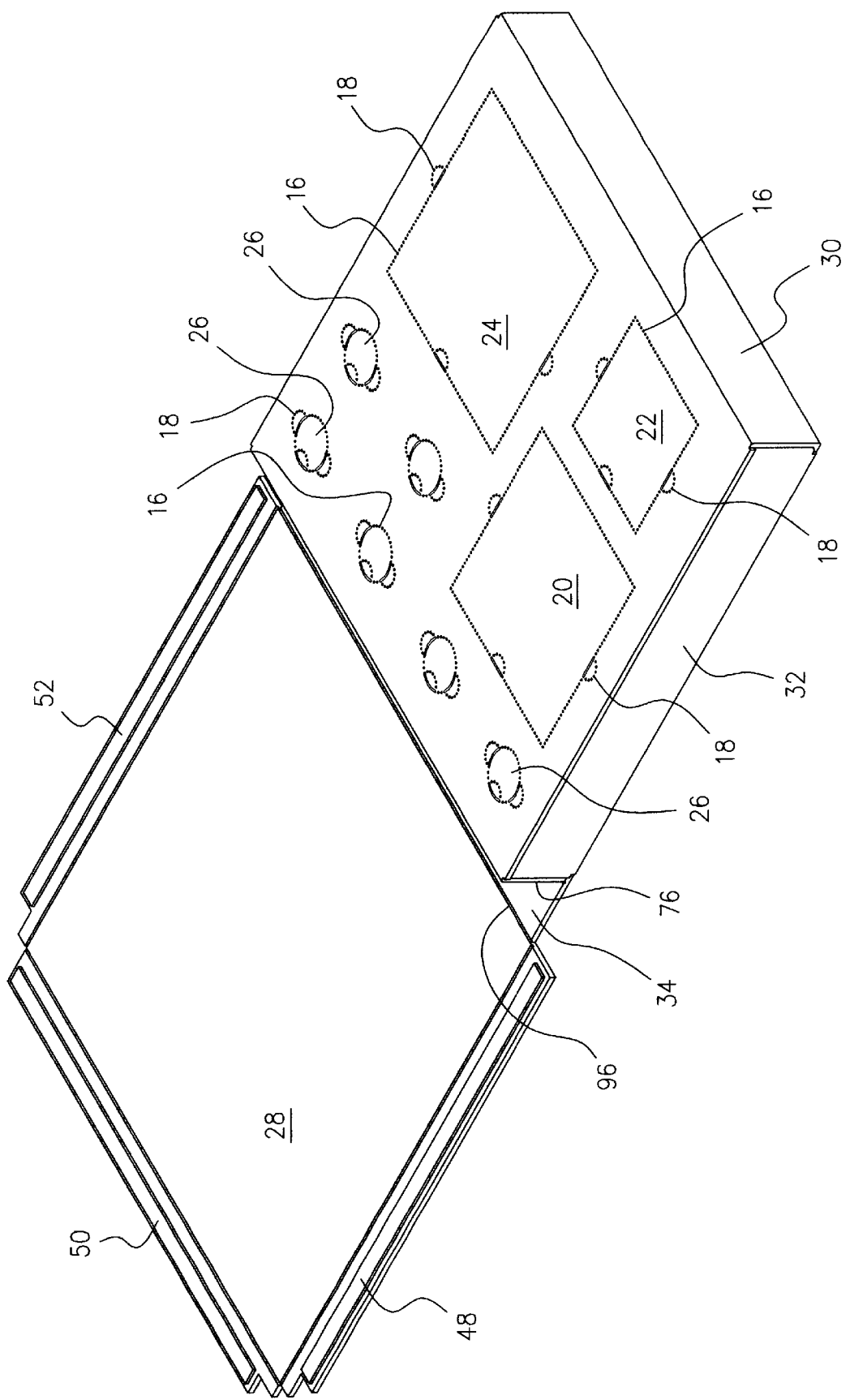
FIG. 5 is a perspective view of the one-piece box with one end portion folded over the styrofoam insert.
Figure 6:
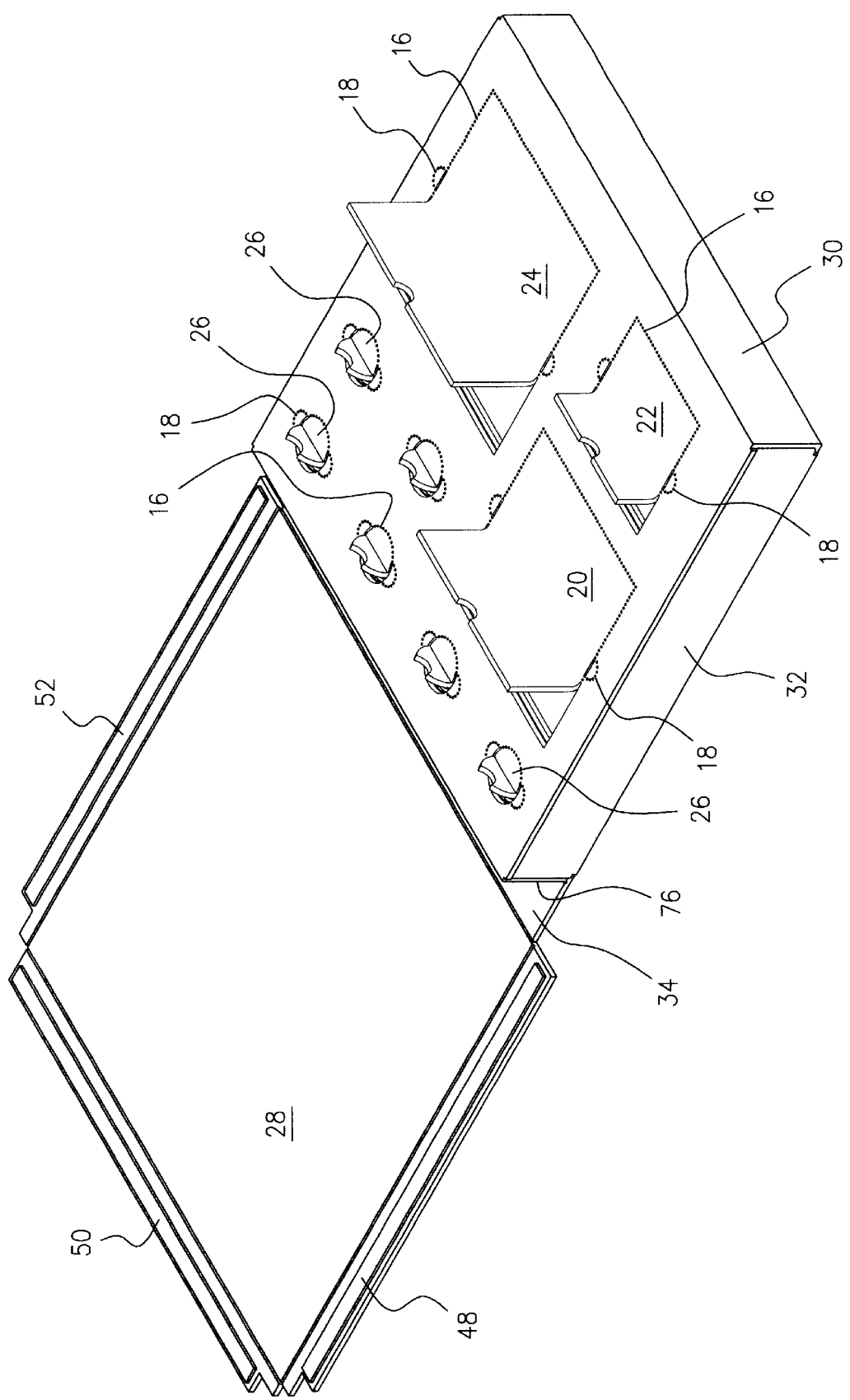
FIG. 6 is a perspective view of the box according to FIG. 5 with tear out inserts partially removed.

Referring to FIGS. 5 and 6, sticky tabs 64, 66, 68 and 70 are pulled off to expose an adherence substance 72. Thereafter, food tray cover portion 14 is bent upward at crease 74 so that the adherence substance 72 or side portion 30 contacts end portions 40 and 46. Food tray cover portion 14 has a side portion 76 which is bent inward along crease 78 and then adhered to tabs 42 and 44 as shown in FIG. 6. Side flaps 37 and 39 shown in FIGS. 1–4 are bent upwardly and then directed downwardly and inserted inboard of side portions 32 and 36 respectively.

Figure 7:
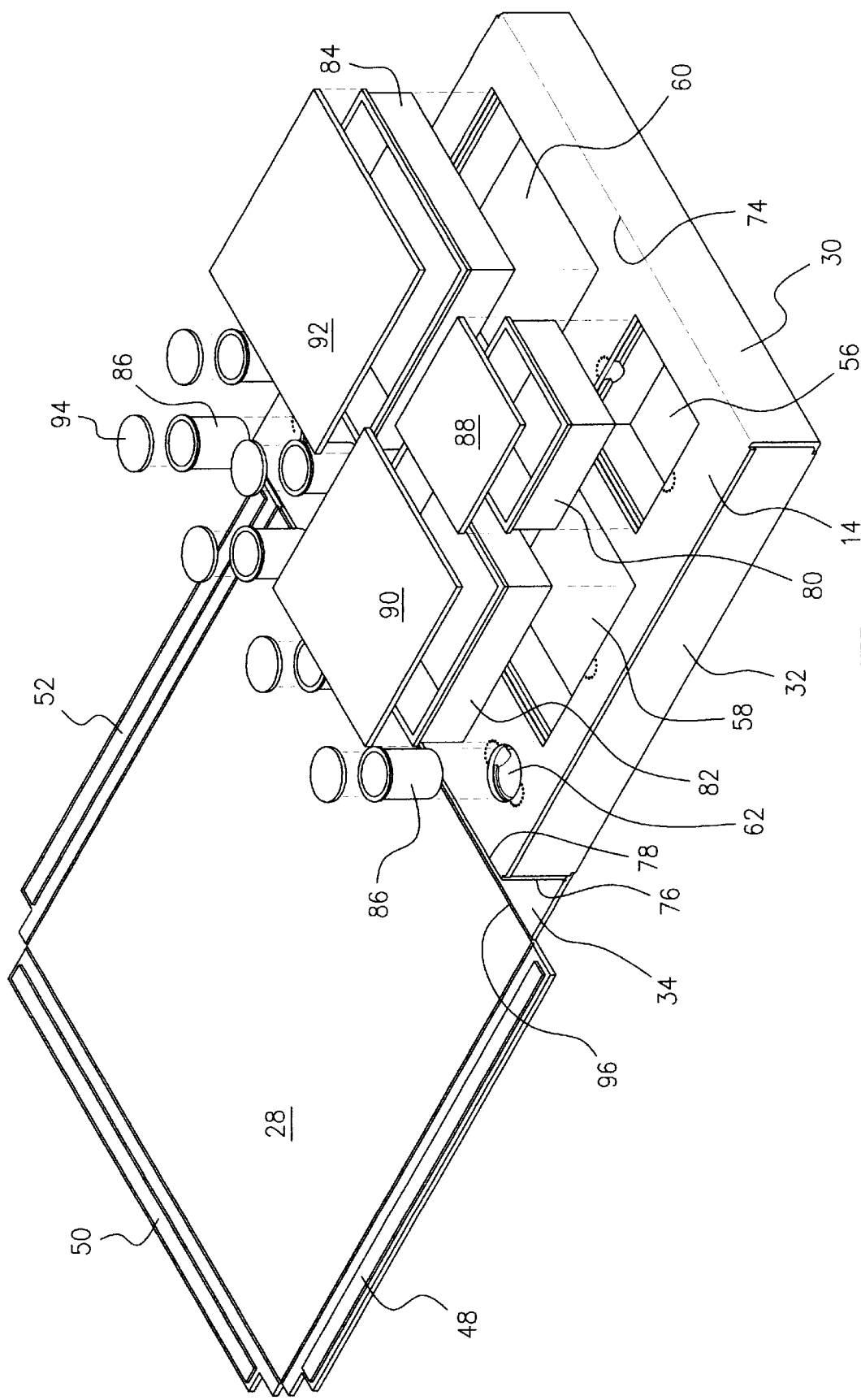
FIG. 7 is an exploded view of food tray items inserted into depressions in the styrofoam block through openings in the folded over end portion of the one-piece box.
Figure 8:
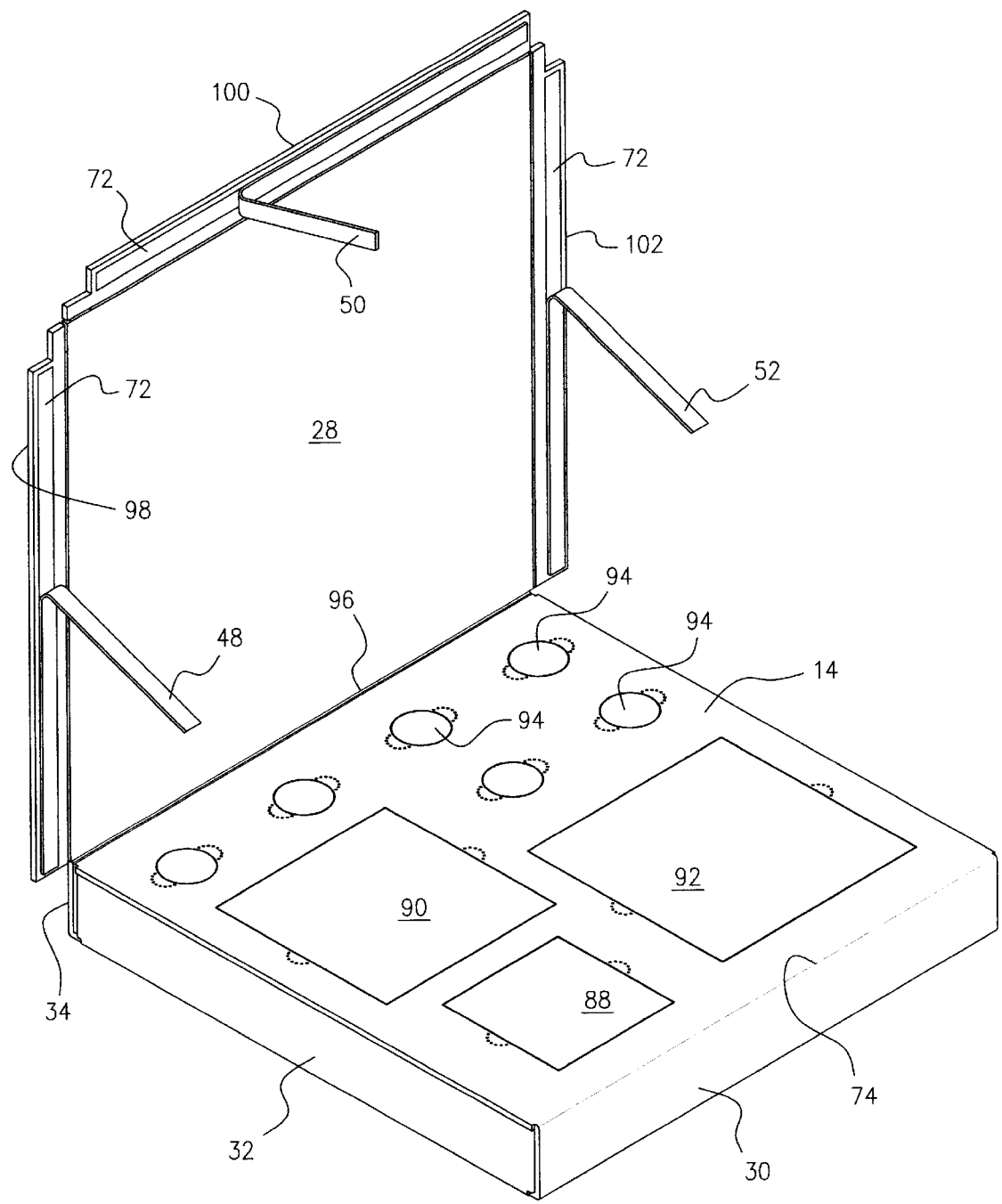
FIG. 8 is a perspective view of the one-piece box loaded with food tray items and tear off strips partially removed from the box cover portion.

As shown in FIG. 7 the tear out portions of food tray cover 14 are removed along their perforations 16 by pulling on tabs 18 as shown in FIG. 8. The food trays 80, 82 and 84 and cups 86 are then inserted in styrofoam depressions 56, 58, 60 and 62 respectively. Covers 88, 90, 92 and 94 are placed over the trays and cups after filling with the food items. The trays, cups and covers are made of a light weight plastic material impervious to moisture.

Figure 9:
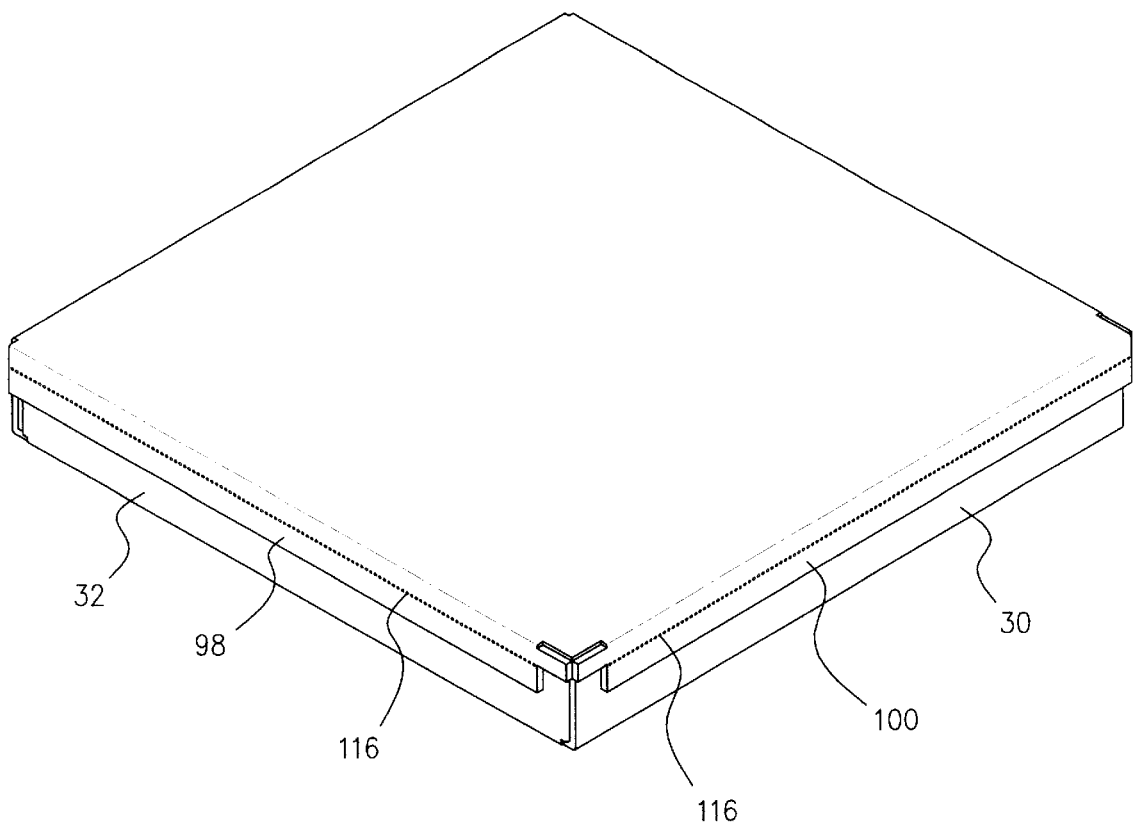
FIG. 9 is a perspective view of the one-piece box fully loaded.
Figure 10:
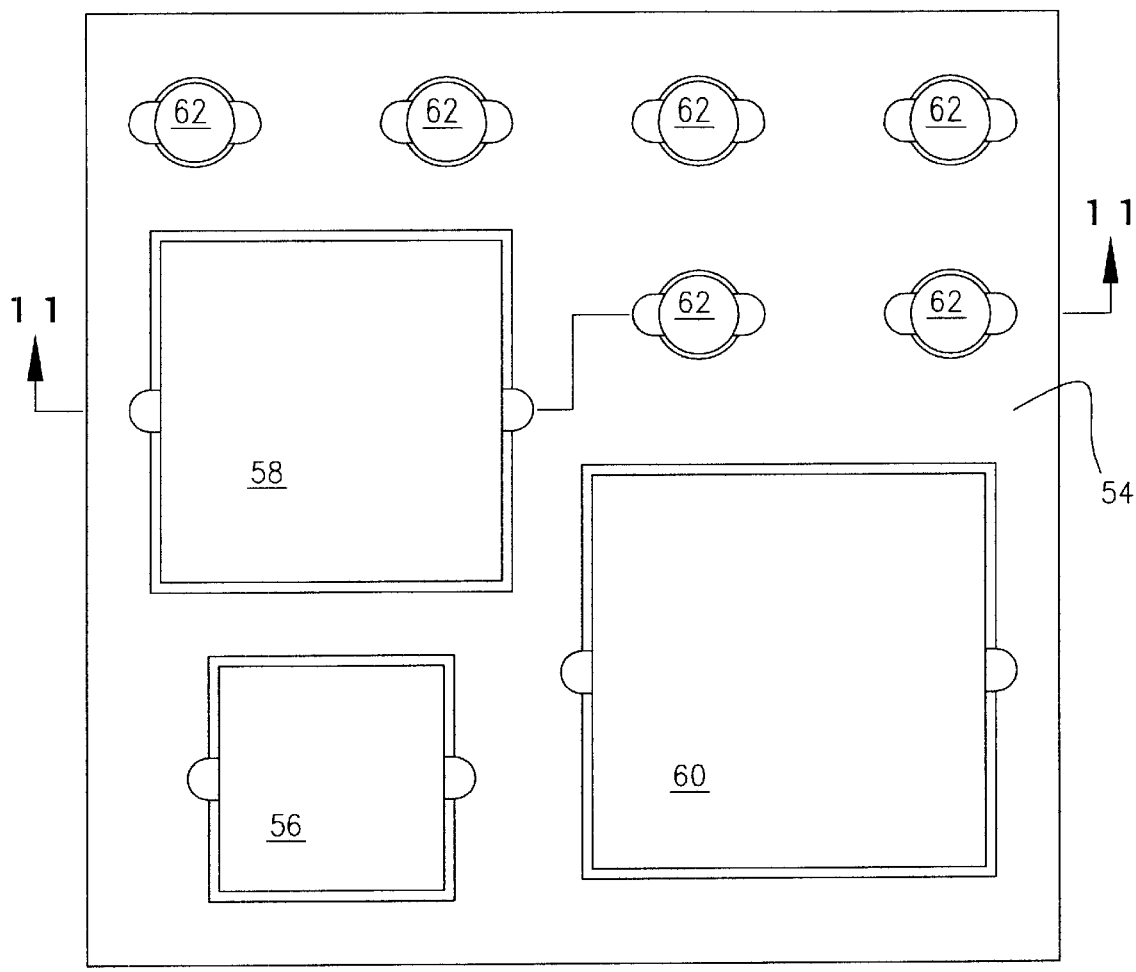
FIG. 10 is a top plan view of the styrofoam insert prior to covering by an end portion of the box.

Referring to FIG. 9, in order to close the box 10, top cover portion 28, after removal of sticky tabs 48, 50 and 52, to expose the adherence substance 72, is bent inwardly at crease 96. Outward flaps 98, 100 and 102 are then bent inward and stuck with adhesive substance 72 to sides 32, 30 and 38 respectively to form the closed box shown in FIG. 10.

Figure 11:
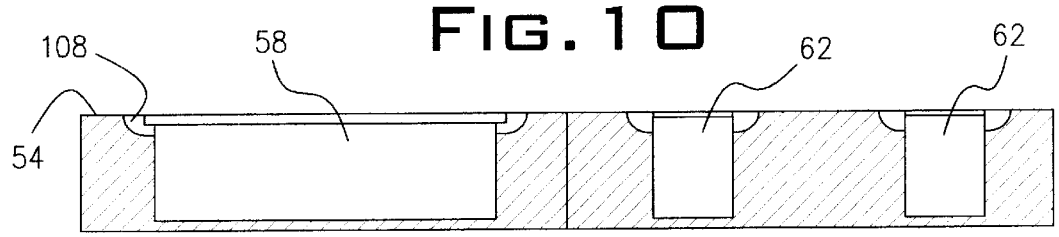
FIG. 11 is a side view sectional elevation of the styrofoam insert along lines 11—11 of FIG. 10.
Figure 12:
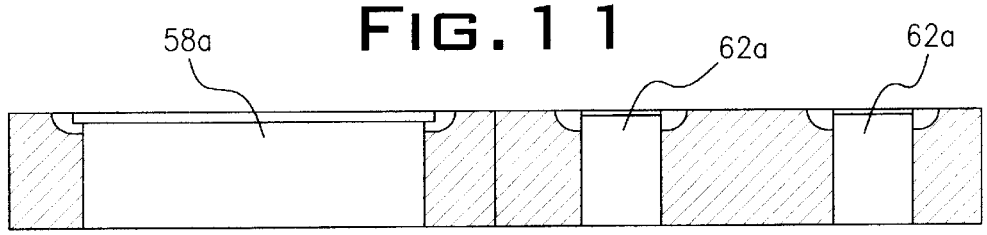
FIG. 12 is an alternate embodiment side view sectional elevation of the styrofoam insert.

The tray 82 or cups 86 placed in the styrofoam insert 54 can have a bottom surface resting on a portion of the styrofoam insert as shown in FIG. 11 or 58a or 62a depressions can wholly penetrate the insert so the tray and cup can rest on the box base surface 12 and may be supported on its sides by the styrofoam insert as shown in FIG. 12.

Figure 13:
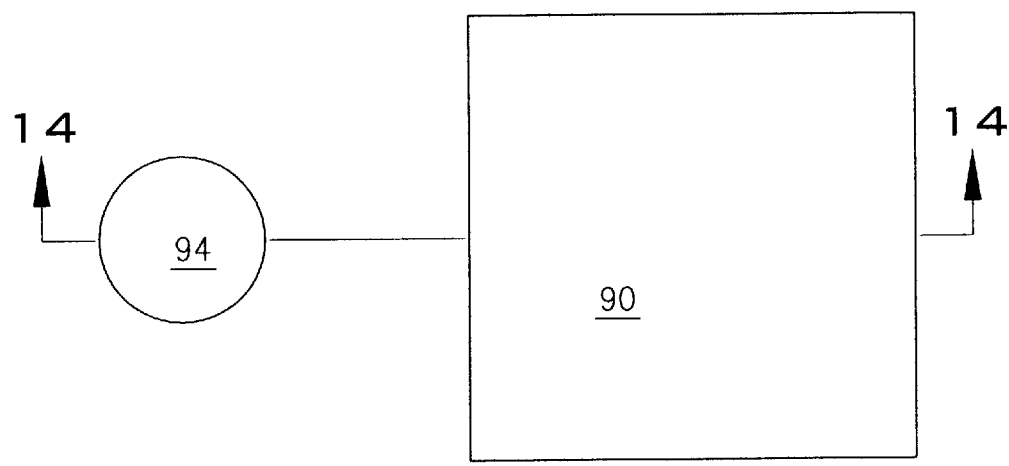
FIG. 13 is a top plan view of a cup and tray food container lid.
Figure 14:
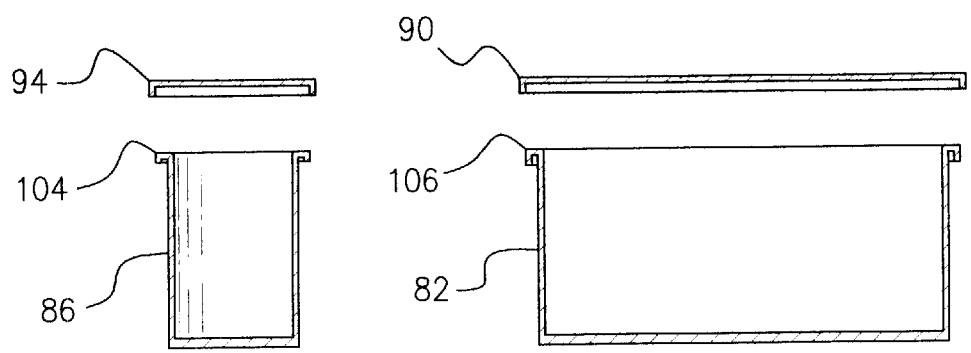
FIG. 14 is a side view sectional elevation along lines 14—14 of FIG. 13, showing cup and tray food containers.
Figure 15:
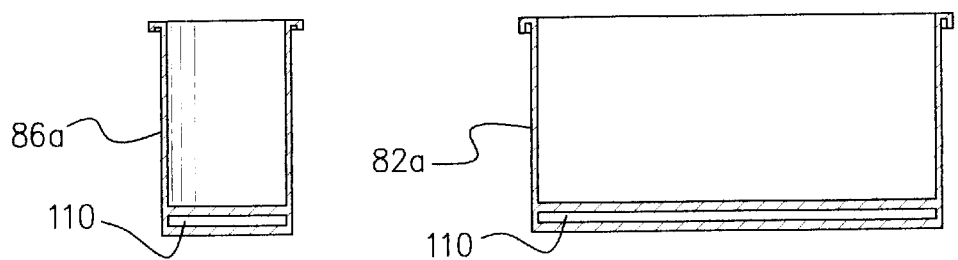
FIG. 15 is an alternate embodiment side view sectional elevation of the cup and tray food containers.

The top edge 104 of the cup and top edge 106 of the tray protrude away from the inner surface of the cup and tray respectively as shown in FIGS. 13–15. Both the cup 86a and tray 82a have an air pocket 110 in an alternative embodiment as shown in FIG. 15.

The closed box as shown in FIG. 9 has exterior tear away tabs 112 and 114 with perforations 116 to allow easy opening of the box to gain access to the food tray and cups.

Figure 16:
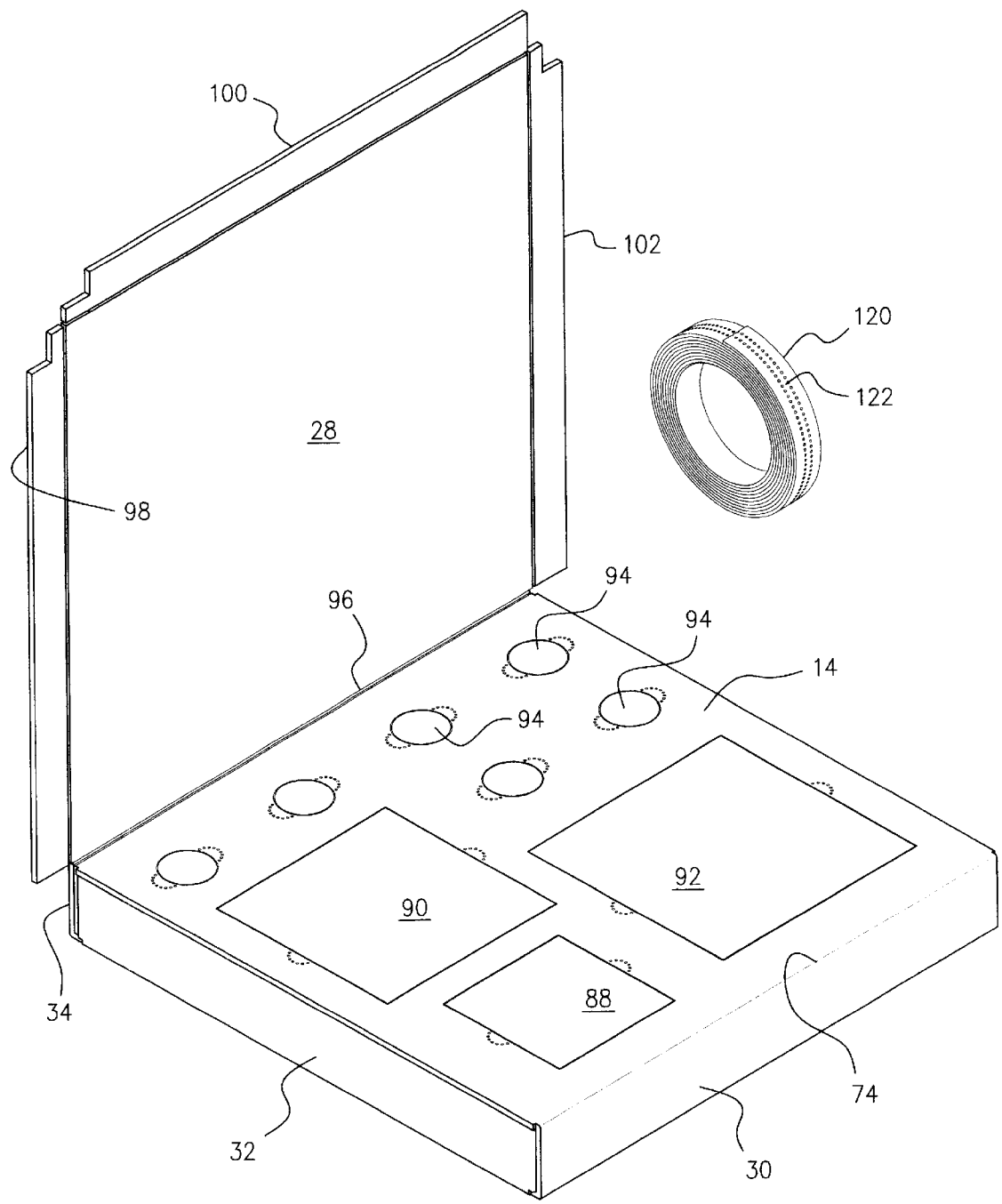
FIG. 16 is a perspective view of an alternative method of sealing the box as compared to FIG. 8.
Figure 17:
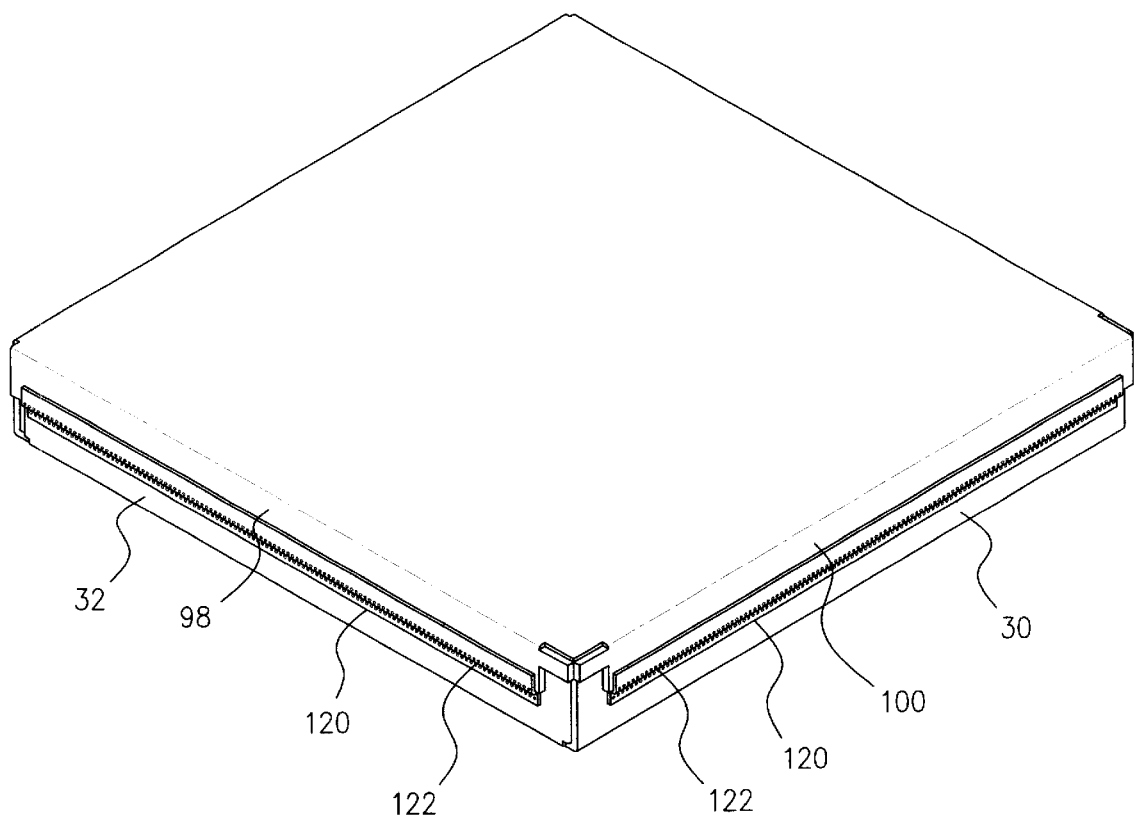
FIG. 17 is a perspective view of the one-piece box fully loaded using the sealing method shown in FIG. 16.

The closed box shown in FIG. 17 has been sealed in an alternate method as shown in FIG. 16 where outward flaps 98, 100 and 102 have no tear off strips. The flaps 98, 100 and 102 are fastened to sides 32, 30 and 36 respectively with tape 120 having perforations 122 for easy removal to gain access to the beverage cups and food containers.

The above description has described specific structural details embodying the invention. However, it will be within the skill of one having ordinary skill in the art of box making to make modifications without departing from the spirit and scope of the underlying inventive concept of the one-piece box.

Having described the invention in detail the following is claimed:

1. A one piece foldable box for retaining food items comprising:

a planar bottom panel foldably attached to a first and second pair of opposed upwardly foldable side members supporting in an upward portion a food or beverage tray insert, a first side member of the first pair of opposed side members foldably attached on a distal edge to a planar food tray cover and to the planar bottom panel on a proximal edge, a second side member of the first pair of opposed side members foldably attached on a distal edge to a planar cover panel and on a proximal edge to the planar bottom panel, the planar food tray cover foldably attached to a food tray cover side member on a side edge opposite the distal edge of the first side member of the first pair of opposed side members, the second pair of opposed upwardly foldable side members having inwardly foldable end portions, the planar food tray cover having at least one removable portion, the planar food tray cover adapted for folding over a top surface of the food or beverage tray insert with the food tray cover side member adhesively attached to an outside surface of the inwardly foldable end portions of the second pair of opposed side members distal from the planar food tray cover and the first side member of the first pair of opposed side members adhesively attached to an outside surface of the inwardly foldable end portions of the second pair of opposed side members proximal to the planar food tray cover, and the planar cover panel adapted to enclose the planar food tray cover in a closed position.

2. The one piece foldable box according to claim 1 wherein the food or beverage tray insert has multiple depressions for receipt of food or beverage containers.

3. The one piece foldable box according to claim 2 wherein the food or beverage tray insert is made of styrofoam material.

4. The one piece foldable box according to claim 2 wherein the removable portions of the planar food tray cover correspond to the multiple depressions in the tray insert whereby after such removable portions are torn out food and beverage containers are inserted into the multiple depressions.

5. The one piece foldable box according to claim 1 wherein the planar cover panel has a foldable side member opposed to the second side member of the first pair of opposed side members of the planar bottom panel and a pair of opposed foldable side members at a right angle to the planar cover panel foldable side member whereby the side members of the cover panel in a folded condition adhere to an outside surface of the second pair of opposed side members on the planar bottom panel and to an outside surface of the first side member of the first pair of opposed side members on the planar bottom panel.

6. A one piece foldable box for retaining food items comprising:

a planar bottom panel attached by a first upwardly foldable side member to a planar top cover panel and by a second upwardly foldable side member to a planar food tray cover panel, the planar bottom panel having a third and fourth side member folded upwards with end portions folded inwardly, a food or beverage tray insert mounted along an inner surface of the upwardly folded third and fourth side members and an inner surface of the end portions folded inwardly, the planar food tray cover having at least one removable portion and a fifth upwardly foldable side member distal from the second upwardly foldable side member, the planar top cover panel attached to a sixth upwardly foldable side member distal from the first upwardly foldable side member and a seventh and eighth upwardly foldable side member attached on opposite sides of the planar top cover panel between the first and sixth upwardly foldable side members, the sixth, seventh and eighth side members having an adhesive surface covered by a removable strip, the second and fifth side members having an adhesive surface covered by a removable strip, whereby the planar food tray cover is adapted to fold over a top surface of the food or beverage tray insert and the planar top cover panel is thereafter adapted to fold over a bottom surface of the planar food tray cover.

7. The one-piece foldable box according to claim 6 wherein the food or beverage tray insert is made from styrofoam and has multiple depressions for receipt of food or beverage containers.

8. The one-piece foldable box according to claim 7 wherein the removable portions of the planar food tray cover correspond to the multiple depressions in the tray insert whereby after the planar food tray cover is folded over the tray insert and the removable portions are torn away food and beverage containers can be placed in the multiple depressions.

9. The one-piece foldable box according to claim 6 wherein the planar food tray cover panel has a ninth and tenth upwardly foldable side member, the ninth and tenth side members downwardly placed inboard of the third and fourth side members respectively.

10. The one-piece foldable box according to claim 6 wherein the sixth, seventh and eighth side members each have a longitudinal perforated outer surface to permit opening of the box.

11. The one-piece foldable box according to claim 6 wherein each of side members six, seven and eight are sealed to the planar bottom panel by longitudinal strips of double line perforated tape.

12. The one-piece foldable box according to claim 6 wherein the planar food tray cover has multiple removable portions delineated by perforations along an edge of the removable portions.

13. The one-piece foldable box according to claim 7 wherein the multiple depressions pass entirely through the styrofoam insert.

14. A one-piece foldable box for retaining food items comprising:

- a planar bottom panel attached by a first upwardly foldable side member to a planar top cover panel and by a second upwardly foldable side member to a planar food tray cover panel, the planar bottom panel having a third and fourth side member folded upwards with end portions folded inwardly,
- a food or beverage tray insert mounted along an inner surface of the upwardly folded third and fourth side members and an inner surface of the end portions folded inwardly,
- the planar food tray cover panel having at least one removable portion and a fifth upwardly foldable side member distal from the second upwardly foldable side member,
- the planar top cover panel attached to a sixth upwardly foldable side member distal from the first upwardly foldable side member and a seventh and eighth upwardly foldable side members attached on opposite sides of the planar top cover panel between the first and sixth upwardly foldable side members sealed to the exterior of the second, third and fourth side members by a longitudinal adhesive tape.

15. The one piece foldable box according to claim 14 wherein the longitudinal adhesive tape has spaced apart rows of longitudinal perforations for easy opening of the box.

* * * * *